Patented Feb. 10, 1948

2,435,700

UNITED STATES PATENT OFFICE 2,435,700

PROCESS OF ELECTROLYTICALLY PRODUCING AZO DYES ON A FIBROUS SHEET MATERIAL AND THE FIBROUS SHEET MATERIAL FOR SAID PROCESS

Myer Solomon, deceased, late of Westmont, N. J., by Nellie W. Solomon, administratrix, Princeton N. J., assignor to Radio Corporation of America, a corporation of Delaware No Drawing. Application December 23, 1942, Serial No. 469,960

5 Claims. (Cl. 204—2)

The present invention relates to the electrolytic production of azo dyes by subjecting to the action of an electrolyzing current a traveling carrier carrying a composition involving a diazonium compound, an azo dye coupling component and an inhibitor designed to preclude premature coupling of the diazonium compound and the azo dye coupling component. It further contemplates fibrous sheet material carrying such compositions and suitable for the electrolytic production of azo dyes. The present application is a continuation-in-part of copending application Serial No. 178,743, now U. S. P. 2,306,471.

In the aforesaid copending application, there are disclosed a plurality of general methods of electrolytic dye formation as well as the adaptation of these methods to facsimile recording. These general methods are described as viz., (I) electrolytic coupling, or causing azo dye formation by preparing a diazonium salt solution and subjecting the solution and a coupling compound to an electric current; (II) electrolytic diazotization or forming a diazonium compound by subjecting a solution containing amine, nitrite, and a coupling compound to an electric current and permitting the formation of an azo dye by spontaneous coupling with the coupling compound; and (III) electrolytic oxidation, or forming dyes by electrolytically oxidizing chemicals that react to produce dyes.

An important field of application of the invention involving features of procedure and composition as set forth in the parent case, discloses various types of facsimile receivers utilized at the present time. These are dependent upon electrical transmission of pictures, printed matter, and the like as well as their attendant shortcomings, which include lack of stable, effective, expedient reproduction as the result of imperfect regulation and control.

The present disclosure may be generally stated to embrace the features of invention pertaining to electrolytic coupling of a preformed diazonium compound with an azo dye coupling component in the presence of a coupling inhibitor. In its preferred embodiment, it produces the dye in situ on a supporting material adapted for receiving the same in the form of transmitted pictures, printed matter, and similar reproductions in accordance with the facsimile recording.

Heretofore, facsimile recordings have not lent themselves to effective reproduction of the object or indicia, and in some cases pursuant to the procedure utilized, stable showings have not been attainable. Generally the prior art methods have not been adapted to obtaining half-tones and shades that are duly representative of the object. This has been attributable to the lack of sensitivity, and imperfect control, as applied both to the dye production and to the recording of electrically transmitted objects.

It is an object of the invention to obviate the difficulties and uncertainties heretofore prevalent in the art.

It is a further object to obtain azo dyes by electrolytically coupling a diazonium compound with an appropriate phenolic coupling substance in the presence of a coupling inhibitor.

An additional object of the invention is to produve azo dyes by treatment of mixtures or solutions of reagents adapted to form a diazonium compound and electrolytically phenolic coupling this compound with a coupling reagent in the presence of a coupling inhibitor.

Still another object of the present invention resides in the adaptation of the electrolytic coupling procedure applied to a diazonium compound and a phenolic coupling reagent in the presence of a coupling inhibitor to attain facsimile recording.

An important object embraces the formation of azo dyes in situ on a receiving material or support by subjecting a diazonium compound and a phenolic coupling compound to an electric current in the presence of a coupling inhibitor.

A further object is a fibrous carrier treated with a composition containing a diazonium compound, an electrolyte, a phenolic azo dye coupling component and a coupling inhibitor such as hydroxylamine or semicarbazide.

A further object is to regulate the facsimile recording from a transmitting source by controlling the electrolytic coupling of a diazonium compound and a coupling compound in situ on a receiving material.

Other objects, features, and advantages of the invention will be apparent from the following description thereof.

The theory of the use of electrolytic coupling of diazonium compounds (1) is based primarily on the fact that diazonium compounds under certain conditions may be mixed with coupling compounds without coupling or dye formation actually taking place until the mixture is subjected to an electric current. Preferably "coupling inhibitors" are present to prevent undesired spontaneous coupling where the current is not applied.

For facsimile recording, the recording surface, such as paper, may be made wet by a mildly acid solution containing diazonium and phenolic coupling compounds, and is then passed through the facsimile receiving or recording apparatus in such as manner that electric current causes dye formation as spots corresponding to dark spots on the transmitted picture or printed matter, in accordance with the electrical impulses being received from the facsimile transmitting device.

A water solution is prepared containing the following chemicals:

I. A neutral electrolyte, such as sodium or potassium chloride or sulphate. This serves to permit the flow of electric current through the paper.

II. A diazonium salt, preferably one sensitive to light.

formed only at points corresponding to gray, colored or black points on the original subject matter transmitted, thus producing a facsimile recording. Half-tones are obtained because the intensity of color is a function of the amount of dye formed, which increases with increase of current strength, dependent upon electric impulses emanating from the source of transmission. After recording has been accomplished, the paper is exposed to strong light in order to destroy the unchanged diazonium salt, and thus fix the white background. The recordings may also be washed, thereby removing the unused chemicals, as most of these dyes are fast to washing.

Instead of having both the diazonium salt and the coupling compound in the solution, one or both of them may be pre-coated on the paper and be missing from the electrolytic solution, or a paper coated with all of the ingredients may be wet or moistened with water and then passed between the electrodes.

The following is an example of the ingredients which may be used to form a solution whereby a dye may be produced by electrolytic coupling:

| | Ingredients | Gram-Molecular Weight Used | Amount Used |
|---|---|---|---|
| I | Amine-source of Diazonium Salt | .033 | Varies with molecular weight of amine. |
| II | Hydrochloric Acid: Normal solution (or equivalent amount of other acids). | .08 | 80 cc. |
| III | Sodium Nitrite | .03 | 2.07 grams. |
| IV | Coupling Compound: hydroxy aromatic compound | .010 to 0.15 | Varies with molecular weight or compound. |
| V | Sodium Chloride | 1.0 | 58.47 grams. |
| VI | Ice and water | | To total volume of 1000 cc. |
| VII | Sodium Hydroxide: Normal solution NaOH | .05 to .1 | 500 to 100 cc. Used only in special cases. |
| VIII | Coupling Inhibitor | Varying amounts | |

III. A coupling compound, preferably phenolic in nature, coupling only under alkaline conditions.

IV. A small amount of an acid, to maintain the acidity of the solution and thus prevent premature coupling.

In addition to the four above ingredients, the solution also contains small amounts of a coupling inhibitor such as semicarbazide or hydroxylamine, which aids acidity in preventing premature coupling. The solution may also contain if desired, reducing agents, as sulphites, hydrosulphites, thiosulphates, hydroquinone, glucose, tartrates, oxalates, stannous chloride, etc., which prevent the gradual darkening of the background, or salts of copper, iron, chromium, aluminum or other metals, which act as mordants or otherwise affect the color of the dyes or the light sensitivity of the diazonium salt.

The azo dye is formed at the negative or alkaline electrode, the electric current creating an alkaline condition which persists long enough for the diazonium and the coupling compounds to combine with each other. The following chemical equation represents the reactions that are caused by the current flow, Ar and Ar' representing benzene or naphthalene rings with or without one or more substituent groups.

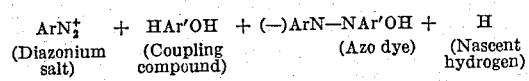

$ArN_2^+ \quad + \quad HAr'OH \quad + \quad (-)ArN-NAr'OH \quad + \quad H$
(Diazonium salt) (Coupling compound) (Azo dye) (Nascent hydrogen)

The nascent hydrogen may either combine with itself and pass off as molecules of hydrogen gas ($H_2$), or react with some of the chemicals in the solution.

The synchronization of paper feed and current flow with the facsimile signals causes dye to be The procedure of mixing the ingredients is as follows:

The diazonium salt, I, is dissolved in II, with boiling and/or addition of small amounts of water if necessary. The resultant amine hydrochloride solution is then cooled below 8 degrees centigrade, preferably by adding ice. The sodium nitrite, III, is dissolved in 25 to 50 cc. of water and poured slowly (about one minute) into the cooled solution with constant agitation. Generally one or more color changes take place accompanied by a slight effervescence, due to nitrogen gas formation. It is desirable to keep this gas formation to a minimum, which is accomplished by keeping the mixture cool. In some cases very little gas forms even at room temperature. The coupling compound IV and the sodium chloride V are dissolved either together or separately in water and added to the mixture of I, II and III after this has stood for at least fifteen minutes. The sodium hydroxide VII is used only if I is an amino sulphonic or carboxylic acid insoluble in II. The coupling inhibitor is usually added with the coupling compound IV. Stable diazonium salts, such as nitrosamines, chlorostannates or other double salts, etc., may be used instead of amines and sodium nitrite, in which case the ingredients are merely dissolved in water to a total of one liter.

If an amine hydrochloride, or a poly-amino compound is used as ingredient (I), the amount of hydrochloric or other acid is changed accordingly, so that when I, II and III are finally mixed there are .05 gram equivalent weights of acid for the .03 of sodium nitrite, in addition to the acid required to neutralize all of the amino groups present in the amino compound.

The amount of coupling compound varies with its coupling strength. Usually darker colors are produced by using more than one gram-molecular equivalent of diazonium salt per gram-molecular equivalent of coupling compound, due probably to partial formation of dyes having two or three molecules of diazonium salt coupled to one molecule of the coupling compound.

Ordinary table salt may be used to supply the sodium chloride (ingredient V) or other strong neutral electrolytes may be substituted. It need not be accurately weighed, as any amount between 40 and 120 grams per liter gives practically identical recordings.

The amounts of the ingredients may be widely varied from those given above, provided that no uncombined nitrite remains in solution when the coupling compounds are added. This may be accomplished most easily by using a 10% excess of amine or by adding a small amount of urea to the amine-nitrite mixture before adding the remaining ingredients.

The preparation may be simplified somewhat by using solid ingredients exclusively and pre-mixing the dry powders, so that the ultimate user will merely dissolve each of three powders separately in water, mix the resulting solutions in the proper order, and finally add more water to the required volume. Solid acids, such as tartaric, citric, oxalic, formic, sodium or potassium acid sulphates, etc., are used for ingredient III instead of hydrochloric acid. Powder A contains I, B contains III, and C contains IV (and VIII if used). Ingredient II may be in either A or B, V may be in either A, B or C, and VII, when used, is placed in A (in which case II is in B).

Some of the solutions have been kept a week without losing their strength. They should be stored in the dark. Separate solutions of diazonium salts and coupling compounds are still more stable, and some of these may be kept for months.

A specific example, which is representative of the numerous solutions that have actually been used for electrolytic coupling, follows:

*Example*

| No. | Ingredients | | Use | Grams used per liter |
|---|---|---|---|---|
| | Name | Formula | | |
| I | p-amino diethylaniline hydrochloride | $\text{NH}_2\text{—C}_6\text{H}_4\text{—N(C}_2\text{H}_5\text{)}_2 \cdot \text{HCl}$ | Amines—source of diazonium compounds | 4.4 |
| II | p-amino dimethylaniline hydrochloride | $\text{NH}_2\text{—C}_6\text{H}_4\text{—N(CH}_3\text{)}_2 \cdot \text{HCl}$ | | 1.90 |
| III | Tartaric Acid | $(\text{CHOH COOH})_2 \cdot \text{H}_2\text{O}$ | Acid. Source of hydrogen ion-reducing agent to whiten background. | 6.22 |
| IV | Sodium Nitrite | $\text{NaNO}_2$ | To diazotize I and II | 2.07 |
| V | Phloroglucinol | $\text{C}_6\text{H}_3(\text{OH})_3$ | Coupling Compound | .042 |
| VI | Chicago or 2S Acid | $\text{HO—C}_{10}\text{H}_4(\text{NH}_2)(\text{SO}_3\text{H})_2$ | Coupling Compound | 2.39 |
| VII | Common Salt | NaCl | Electrolyte | 58.47 |
| VIII | Water | To total volume of one liter. | | |

I, II and III are dissolved in cold water, IV is added and the mixture allowed to stand at least 15 minutes, during which time V and VI are dissolved in water, warming if necessary and VII is added to the solution of V and VI with stirring until dissolved. The two solutions are mixed and water added to volume. In summer, it is necessary to cool the water (preferably by adding ice) in which I, II and III are dissolved.

The solution gives purplish-blue, almost black recordings on a yellowish green background. Exposure for one-half minute to a carbon arc light, or three to five minutes to direct sunlight bleaches the background until it is almost white. On standing for several weeks, the white background thus obtained becomes pale grey-brown. Washing the recordings with water removes very little of the color, and greatly reduces the background darkening.

*Examples of amines used for diazonium salts*

| Amine | Color produced with Phloroglucinol |
|---|---|
| 4-aminodiphenylamine monohydrochloride. | Deep purple on white. |
| 3-methyl-4-aminodiethylaniline | Dark brown-purple on very pale yellow. |
| 4-amino diethylaniline | |
| 4-amino dimethylaniline | |
| 2,5-diaminoanisole dihydrochloride | Dark brown on pale tan. |
| Para phenylene diamine | Orange-brown on white. |

*Examples of coupling compounds*

| Compound | Remarks |
|---|---|
| Phloroglucinol | Best coupling compound to date. |
| Resorcinol | Good, but give lighter colors than phloroglucinol. |
| Orcinol | |
| Pyrogallol | Darker color, but poorer definition and background than phloroglucinol. |
| 1-amino-8-naphthol 2,4-disulphonic acid (Chicago or 2S acid). | Colors are more blue than phloroglucinol, and back-ground gradually turns pale pink. |

It will be noted that the electrodes per se do not play any part in the formation of the dye other than as a means for subjecting the solution to an electric current, or as in the case of some oxidation dyes, where they may act as catalysts. The metal or material of which the electrodes are made does not combine with the solutions or chemicals and does not enter into the composition of the electrolytically produced dyes. The electrodes may, in some instances, prevent the formation of the dye as stated above and by selecting a metal which will prevent dye formation for one of the electrodes the dye may be permitted to form on one side of the paper and prevented from forming on the other, even when the current is reversed. Such a choice of electrodes frequently is of particular advantage where alternating current is applied to the electrodes, or where the unrecorded side of a facsimile recording is to be used for a subsequent recording.

By the use of any of the above mentioned solutions and compounds, it is possible to produce dyes and pigments by subjecting solutions or mixtures of chemicals to an electric current. Such dyes or pigments may then be collected in a paste, powder or liquid form and subsequently used for coloring paints, inks, etc., or for dyeing various materials. Also, materials such as clothing, piece goods, yarn, etc., may be dyed by immersing such material in a container which has been filled with the solutions and subsequently subjecting the entire mixture to the flow of an electric current in order that the dyes may be fixed in the materials so immersed. This method produces a uniform coloring of the material, particularly when some agitation is present during the time that the electrical current is applied to the solution.

If it is desired that not all of the material be subjected to the electrical current in order that varying intensities of colors may be produced, or that designs or other patterns be printed on the material, it is obvious from the above that only portions of the material, all of which has been treated with the proper chemicals, need be subjected to the electric current and such selectivity of activation may be accomplished by controlling the distribution of current to various portions of the material either by controlling the current per se or by applying a non-conducting material such as varnish, lacquer, paraffin, etc., to the material where it is desired that no current shall pass and no color shall be present. Furthermore, the material may be passed between a pair of rollers which are to act as electrodes of an electric circuit and wherein one or both of the rollers is recessed or engraved or otherwise altered in contour or provided with non-electrically conductive areas in order that only portions of the material passing between the rollers will be subjected to the passage of current.

While a preferred adaptation of the present invention is concerned primarily with the reproduction of printed matter, pictures, etc., by a facsimile system, the invention may well be applied to other fields, and in combination with other methods of dye formation.

Furthermore, it is to be understood that the invention, when applied to a facsimile receiver, may be used in such a manner as to produce a continuous process wherein the paper to be printed is fed from a roll and passed through the solution in order to sensitize the same. The paper so sensitized may then be directly transferred or fed to the facsimile receiver at which point the electric current causes the solution contained in the paper to be changed into dyes in accordance with the values of the electric current. If desired, after passing through the facsimile receiver, the paper may or may not be automatically or otherwise exposed to light and/or directed to a fixing bath and subsequently washed in order to reduce the tendency for the background to discolor. After the paper has been washed it may then be passed automatically or otherwise to a dryer at which point the facsimile reproduction is completed and ready for perusal and storage.

It is also to be understood that sheets of paper or material may be impregnated with one or another of the various solutions and the paper permitted to be subsequently dried. When the paper is dry it is relatively non-conducting and is not in a proper condition to be operated upon by the passage of electric current. The paper may then be humidified or dampened by any appropriate means, such as by steam or water vapor, for instance, in order to increase the conductivity thereof and the paper may then be placed in the facsimile receiving machine for use. By so preparing separate sheets of paper or separate rolls of paper it is possible to use the sensitized paper by merely subjecting the same to a certain degree of moisture in order that the current may pass therethrough and accordingly cause a dye to appear on the paper.

It is also to be understood that paper, cloth, or other materials on which dyes are to be produced electrolytically may be subjected in whole or in part to any number of successive chemical treatments, and electric current applied to all or part of the treated material before, during, or after any stage or stages of the treating process, in order to produce various multicolor effects.

While the invention is described in accordance with preferred embodiments, it is apparent that many variations and modifications both as to procedural details, steps, and composition may be made without departing from the scope of equivalents within the purview and spirit of the invention.

The term "facsimile" as used herein is intended to involve not only the reproduction on the recording material of a pre-existing subject, for example a photograph which is scanned and reproduced in accordance with the impulses emanating from the scanning operation, but also embraces the recording of subject matter in the process of creation or formation without a physically pre-existing subject. As illustrative of this latter category would be the recording of simply a mental preconception, for example a pattern or design, either of a single color and shades thereof, or multicolors, which is recorded in accordance with an appropriate manual or automatic variation of the electric impulses delivered to the electrodes. Similarly in this category is intended the recording of an arbitrary or haphazard design, pattern or other subject, for example one secured by haphazardly or arbitrarily varying electric impulses delivered to the electrode by punching keys on a master keyboard having suitable electrical connections, by manually or automatically varying resistance, or the like.

It is claimed:

1. The process of electrolytically producing azo dyes on a sheet of fibrous material which comprises subjecting said sheet to the action of an electrolyzing current while said sheet is wet with an acid solution containing a diazonium compound, a sufficient quantity of a water-soluble inorganic salt as the electrolyte to facilitate passage of the electrolyzing current, a sufficient amount of a phenolic azo dye coupling component to react with said diazonium compound to form an azo dye and a compound designed to inhibit coupling until the sheet is subjected to the action of the cathode selected from the class consisting of hydroxyl amine and semicarbazide and causing coupling of said diazonium compound and said phenolic compound at the cathode.

2. The process of producing a facsimile record on a fibrous sheet material disposed between electrodes for transmitting electric current varying in accordance with applied electric impulses which comprises moving said fibrous sheet material between the electrodes and simultaneously subjecting the material to the current traveling between said electrodes, while said fibrous sheet material is suitably wet with an acid solution containing a diazonium compound, a sufficient quantity of a water-soluble inorganic salt as the electrolyte to facilitate passage of the electrolyzing current, a sufficient amount of a phenolic azo dye coupling component to react with said diazonium compound to form an azo dye and a compound designed to inhibit coupling until the fibrous sheet material is subjected to the action of the cathode selected from the class consisting of hydroxyl amine and semicarbazide and causing coupling of said diazonium compound and said phenolic coupling component at the cathode.

3. The process as defined in claim 1 wherein the diazonium compound is the diazonium chloride of p-diethylamino-aniline-hydrochloride and wherein the coupling component is phloroglucinol.

4. A fibrous sheet material for the electrolytic production of azo dyes carrying a composition comprising a diazonium compound, a sufficient quantity of a water-soluble inorganic salt as the electrolyte to facilitate passage of the electrolyzing current, a sufficient amount of a phenolic azo dye coupling component to react with said diazonium compound to form an azo dye, a compound designed to inhibit coupling until the fibrous sheet material is subjected to the action of the cathode selected from the class consisting of hydroxyl amine and semicarbazide and a sufficient quantity of acid to render the composition acidic in nature.

5. An article as defined in claim 4 wherein the diazonium compound is the diazonium chloride of p-diethylamino-aniline-hydrochloride and wherein the azo coupling component is phloroglucinol.

NELLIE W. SOLOMON,
*Administratrix of Estate of Myer Solomon, Deceased.*

REFERENCES CITED

The following references are of record in the file of this patent:

UNITED STATES PATENTS

| Number | Name | Date |
| --- | --- | --- |
| 168,466 | Edison | Oct. 5, 1875 |
| 761,310 | Loeb | May 31, 1904 |
| 1,844,199 | Bicknell et al. | Feb. 9, 1932 |
| 1,880,449 | Hickman et al. | Oct. 4, 1932 |
| 1,892,099 | Cornell | Dec. 27, 1932 |
| 1,916,947 | Haendel | July 4, 1933 |
| 1,970,539 | Bausch | Aug. 21, 1934 |
| 2,063,992 | Elsey | Dec. 15, 1936 |
| 2,108,852 | Gettinger | Feb. 22, 1938 |
| 2,173,141 | Talmey | Sept. 19, 1939 |
| 2,181,533 | Kline et al. | Nov. 28, 1939 |
| 2,306,471 | Solomon | Dec. 29, 1942 |
| 1,120,700 | Ehrlich et al. | Dec. 15, 1914 |
| 2,160,882 | Lubs | June 6, 1939 |
| 2,286,662 | Weyde et al. | June 16, 1942 |
| 2,309,492 | Abers et al. | Jan. 26, 1943 |

OTHER REFERENCES

The Aromatic Diazo Compounds, by Saunders, 1936, pages 1–8, 67–74, 102–110.